United States Patent
Greco et al.

(10) Patent No.: US 7,817,799 B2
(45) Date of Patent: Oct. 19, 2010

(54) MAINTAINING ENCRYPTION KEY INTEGRITY

(75) Inventors: Paul Merrill Greco, Tucson, AZ (US); Melanie Jean Sandberg, Tucson, AZ (US); Scott Jeffrey Schaffer, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 979 days.

(21) Appl. No.: 11/530,012

(22) Filed: Sep. 7, 2006

(65) Prior Publication Data
US 2008/0063183 A1 Mar. 13, 2008

(51) Int. Cl.
*H04L 9/00* (2006.01)
(52) U.S. Cl. .......................................... 380/2; 713/194
(58) Field of Classification Search .................. 714/1, 714/2, 52, 54; 713/161, 162, 164, 167, 173, 713/190, 191, 192, 193, 194; 380/2, 28, 380/29, 30, 59, 209, 277, 286
See application file for complete search history.

(56) References Cited

U.S. PATENT DOCUMENTS

| | | | |
|---|---|---|---|
| 5,870,473 A * | 2/1999 | Boesch et al. ................. 705/78 |
| 6,023,643 A | 2/2000 | Jesionowski | |
| 6,295,361 B1 | 9/2001 | Kadansky et al. | |
| 6,484,259 B1 * | 11/2002 | Barlow ........................ 713/159 |
| 6,567,914 B1 | 5/2003 | Just et al. | |
| 6,715,077 B1 * | 3/2004 | Vasudevan et al. .......... 713/191 |
| 6,791,572 B1 * | 9/2004 | Cloney et al. ................ 345/619 |
| 6,915,434 B1 | 7/2005 | Kuroda et al. | |
| 6,918,040 B2 | 7/2005 | Ries et al. | |
| 6,950,522 B1 | 9/2005 | Mitchell et al. | |
| 6,981,141 B1 * | 12/2005 | Mahne et al. ................ 713/165 |
| 7,013,389 B1 | 3/2006 | Srivastava et al. | |
| 7,185,205 B2 * | 2/2007 | Launchbury et al. ........ 713/189 |
| 2001/0009583 A1 * | 7/2001 | Murakami .................... 380/278 |
| 2001/0042210 A1 * | 11/2001 | Blaker et al. ................. 713/190 |
| 2002/0164035 A1 | 11/2002 | Yokota et al. | |
| 2002/0188839 A1 * | 12/2002 | Noehring et al. ............. 713/153 |
| 2003/0023954 A1 * | 1/2003 | Wilkinson et al. ........... 717/118 |
| 2003/0037248 A1 | 2/2003 | Launchbury et al. | |
| 2003/0081787 A1 | 5/2003 | Kallahalla et al. | |
| 2003/0097558 A1 * | 5/2003 | England et al. .............. 713/155 |
| 2003/0099362 A1 | 5/2003 | Rollins | |
| 2003/0196081 A1 * | 10/2003 | Savarda et al. ............... 713/153 |
| 2004/0078584 A1 * | 4/2004 | Moroney et al. ............. 713/189 |

(Continued)

OTHER PUBLICATIONS

John P. Mcgregor and Ruby B. Lee, Protecting cryptographic keys and computations via virtual secure coprocessing, Oct. 2004, ASPLOS-XI.*

(Continued)

*Primary Examiner*—Matthew B Smithers
*Assistant Examiner*—Abu Sholeman
(74) *Attorney, Agent, or Firm*—Rabindranath Dutta; Konrad Raynes & Victor LLP

(57) ABSTRACT

Provided are a method, system, and article of manufacture, wherein a first write only register is maintained in an encryption engine of a cryptographic unit. A second write only register is maintained in a decryption engine of the cryptographic unit. A cryptographic key is written in the first write only register and the second write only register, wherein the cryptographic key is inaccessible for reading from any entity that is external to the cryptographic unit.

30 Claims, 8 Drawing Sheets

U.S. PATENT DOCUMENTS

| | | | |
|---|---|---|---|
| 2004/0143734 A1* | 7/2004 | Buer et al. | 713/153 |
| 2004/0252841 A1* | 12/2004 | Henry et al. | 380/277 |
| 2005/0071591 A1 | 3/2005 | Goodman et al. | |
| 2005/0086471 A1 | 4/2005 | Spencer | |
| 2005/0114659 A1* | 5/2005 | Klein | 713/165 |
| 2005/0204161 A1 | 9/2005 | Caronni | |
| 2005/0207570 A1 | 9/2005 | Yamamoto et al. | |
| 2005/0226423 A1 | 10/2005 | Li et al. | |
| 2005/0243998 A1* | 11/2005 | Plessier | 380/28 |
| 2005/0257073 A1* | 11/2005 | Bade et al. | 713/193 |
| 2006/0062383 A1 | 3/2006 | Kaneda et al. | |
| 2007/0294496 A1* | 12/2007 | Goss et al. | 711/163 |

OTHER PUBLICATIONS

Chinese Office Action dated Mar. 1, 2010 for Application No. 200710140080.0 filed Aug. 14, 2007.

U.S. Patent Application entitled "Selective Encryption of Data Stored on Removable Media in an Automated Data Storage Library", U.S. Appl. No. 11/470,670, filed Sep. 7, 2006, by inventors B. G. Goodman, J.A. Fisher, and L.G. Jesionowski.

Advanced Encryption Standard (AES), Federal Information Processing Standards Publication 197, Nov. 26, 2001, pp. 1-51.

"IBM TotalStorage Enterprise Tape System 3592—SCSI Reference" IBM Corporation, Document No. GA32-0466-02, Oct. 2005.

D.A. McGrew, et al., "The Galois/Counter Mode of Operation (GCM)", May 31, 2005, pp. 1-44.

"IEEE P1619.1/D8 Draft Standard Architecture for Encrypted Variable Block Storage Media", IEEE, 2006, pp. 1-26.

U.S. Patent Application entitled "Configuring a Storage Drive to Communicate With Encryption and Key Managers", U.S. Appl. No. 11/530,022, filed Sep. 7, 2006, by inventors B.G. Goodman, G.A. Jaquette, L.G. Jesionowski and P.M. Greco.

U.S. Patent Application entitled "Keyless Copy of Encrypted Data", U.S. Appl. No. 11/530,008, filed Sep. 7, 2006, by inventors P.M. Greco and G.A. Jaquette.

U.S. Patent Application entitled "Key Generation and Retrieval Using Key Servers", U.S. Appl. No. 11/530,006, filed Sep. 7, 2006, by inventors P.M. Greco, .T.J. Hahn and G.A. Jaquette.

U.S. Patent Application entitled "Recovering Remnant Encrypted Data on a Removable Storage Media", U.S. Appl. No. 11/530,021, filed Sep. 7, 2006, by inventors E.M. Dawson, P.M. Greco, G.A. Jaquette and J.M. Karp.

U.S. Patent Application entitled "Encryption Policy Based on Data Context Recognition", U.S. Appl. No. 11/530,011, filed Sep. 7, 2006, by inventors P.M. Greco, G.A. Jaquette, and W.E. Rhoten.

U.S. Patent Application entitled "Detection and Handling of Encryption Key and Initialization Vector", U.S. Appl. No. 11/530,010, filed Sep. 7, 2006, by inventors P.M. Greco, M.J. Sandberg and S.J. Schaffer.

U.S. Patent Application entitled "Verification of Encryption Key", U.S. Appl. No. 11/530,009, filed Sep. 7, 2006, by inventors P.M. Greco, S. Halevi and G.A. Jaquette.

U.S. Patent Application entitled "Automatically Filling a Drive Table", U.S. Appl. No. 11/530,013, filed Sep. 7, 2006, by inventors T.J. Hahn and G.A. Jaquette.

U.S. Patent Application entitled "Validating an Encryption Key File on Removable Storage Media", U.S. Appl. No. 11/530,019, filed Sep. 7, 2006, by inventors H. Itagaki, J.M. Karp, H. Nakayama, T. Shiratori and P.M. Greco.

U.S. Patent Application entitled "Data Library Background Operations System Apparatus and Method", U.S. Appl. No. 11/470,964, filed Sep. 7, 2006, by inventors B.G. Goodman and L.G. Jesionowski.

U.S. Patent Application entitled "Secure Transmission of Cryptographic Key", U.S. Appl. No. 11/530,014, filed Sep. 7, 2006, by inventors P.M. Greco, M.J. Sandberg, and S.J. Schaffer.

U.S. Patent Application entitled "Rekeying Encryption for Removable Storage Media", U.S. Appl. No. 11/470,994, filed Sep. 7, 2006, by inventors J.A. Fisher, B.G. Goodman, G.A. Jaquette, and L.G. Jesionowski.

U.S. Patent Application entitled "Apparatus, System, and Method for Self-Describing Heterogeneous Magnetic Tape Formatting", U.S. Appl. No. 11/679,736, filed Feb. 27, 2007, by inventors, G.A. Jaquette, S.J. Schaffer and T. Shiratori.

U.S. Patent Application entitled "System and Method for Processing User Data in an Encryption Pipeline", U.S. Appl. No. 11/688,445, filed Mar. 20, 2007, by inventors P.M. Greco, S. Halevi, and G.A. Jaquette.

U.S. Patent Application entitled "Method, System and Apparatus for Dynamically Validating a Data Encryption Operation", U.S. Appl. No. 11/285,408, filed Nov. 22, 2005, by inventors P.M. Greco, M.J. Sandberg, and S.J. Schaffer.

U.S. Patent Application entitled "Use of Indirect Data Keys for Encrypted Tape Cartridges", U.S. Appl. No. 11/742,819, filed May 1, 2007, by inventors P.M. Greco, S. Halevi, and G.A. Jaquette.

* cited by examiner

MAINTAINING ENCRYPTION KEY INTEGRITY

BACKGROUND

1. Field

The disclosure relates to a method, system, and article of manufacture for maintaining encryption key integrity.

2. Background

Hardware and software based cryptographic mechanisms may be used for encrypting and decrypting electronic data. Symmetric key cryptography is a cryptographic mechanism in which a sender and a receiver of a message share a single, common cryptographic key that is used to encrypt and decrypt the message, where the message may include a plurality of data records. The single common cryptographic key is referred to as a symmetric cryptographic key. In contrast to symmetric key cryptography, public-key cryptography uses two cryptographic keys—a public key to encrypt messages and a private key to decrypt the messages. Symmetric key cryptography may also be referred to secret key cryptography and symmetrically encrypted data is data that has been encrypted with a symmetric cryptographic key.

An exemplary cryptographic mechanism is the Advanced Encryption Standard (AES) that can be used to protect: electronic data. The AES uses a type of symmetric cryptographic key called a symmetric block cipher that can encrypt and decrypt data. Encryption can convert data to an unintelligible form called encrypted data, and decrypting the encrypted data converts the data back into its original form. Further details of the AES may be found in the publication. "Specification for the Advanced Encryption Standard (AES)". Federal Information Processing Standards Publication 197, Nov. 26, 2001.

To further address the issues of electronic data storage protection, the "IEEE Std 1619.1" standard provides mechanisms for data protection by specifying encryption with authentication and length-expansion. The IEEE Std 1619.1 standard provides methods suitable for ensuring the privacy and integrity of stored data within applications requiring a high level of assurance. To this end, the IEEE Std 1619.1 standard specifies the AES cipher as used in the Galois/counter mode (GCM) of authentication and encryption of data. Further details of the IEEE Std 1619.1 standard may be found in the publication, "IEEE P1619.1™/D8 Draft Standard Architecture for Encrypted Variable Block Storage Media." Institute of Electrical and Electronics Engineers, Inc., June 2006, Further details of GCM may be found in the publication, "The Galois/Counter Mode of Operation (GCM)" by David A, McGrew and John Viega, May 31, 2005. A cryptographic module that supports GCM may use the GCM algorithm that uses AES with a key of a predetermined length, and such an algorithm may be referred to as "AES-GCM". Such exemplary cryptographic mechanisms for electronic data storage protection may be implemented either in hardware or software.

SUMMARY OF THE DESCRIBED EMBODIMENTS

Provided are a method, system, and article of manufacture, wherein a first write only register is maintained in an encryption engine of a cryptographic unit. A second write only register is maintained in a decryption engine of the cryptographic unit. A cryptographic key is written in the first write only register and the second write only register, wherein the cryptographic key is inaccessible for reading from any entity that is external to the cryptographic unit.

In additional embodiments, an error in the cryptographic unit causes different values to be stored in the first write only register of the encryption engine and the second write only register of the decryption engine, in response to writing the cryptographic key.

In yet additional embodiments, an error flag is maintained in the cryptographic unit. A determination is made by microcode included in the cryptographic unit whether the first write only register has a different value than the second write only register. The error flag is set to indicate an error in the cryptographic unit, in response to determining that the first write only register has a different value than the second write only register. The error flag is set to indicate proper functioning of the cryptographic unit, in response to determining that the first write only register does not have a different value than the second write only register.

In still further embodiments, encrypted data is received for decryption at the cryptographic unit. The encrypted data is decrypted in the cryptographic unit by using the cryptographic key written in the second write only register of the decryption engine, in response to determining that the error flag indicates proper functioning of the cryptographic unit.

In certain embodiments, the cryptographic key is written by microcode included in the cryptographic unit and all pointers that point to the cryptographic key in the cryptographic unit are destroyed after writing the cryptographic key.

In additional embodiments, writing the cryptographic key results in a first value being writing to the first write only register and a second value being written to the second write only register, wherein the first value and the second value may be same or different. Data is received for encryption at the cryptographic unit. The received data is encrypted by using the first value written to the first write only register of the encryption engine to generate encrypted data. The encrypted data is decrypted by using the second value written to the second write only register of the decryption engine to generate decrypted data. A determination is made as to whether the decrypted data is the same as the received data. The generated encrypted data is sent for storage, in response to determining that the decrypted data is the same as the received data. An error is generated, in response to determining that the decrypted data is not the same as the received data.

In further embodiments, the cryptographic key is a previously loaded cryptographic key, wherein a new cryptographic key is loaded by overwriting the first and the second write only registers with the new cryptographic key.

Certain embodiments are implemented in a cryptographic unit, comprising memory, an encryption engine coupled to the memory, a decryption engine coupled to the memory, a first write only register included in the encryption engine, a second write only register included in the decryption engine, and a processor coupled to the memory. Certain embodiments are implemented in a storage library, comprising at least one storage drive, and at least one cryptographic unit included in the at least one storage drive, wherein in certain embodiments the storage library is a tape library. Certain additional embodiments are implemented in a storage drive comprising a removable storage medium, and at least one cryptographic unit, coupled to the removable storage, wherein in certain embodiments, the storage drive is a tape drive.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Many customers need data encryption to ensure security for data. Certain customers may need an assurance that data would be unreadable should the data ever be lost or stolen. There are several different encryption mechanisms that can be implemented in hardware to generate encrypted data. An important element in determining the integrity of the encrypted data is the handling of the cryptographic key used for generating the encrypted data. If the encryption key is not handled in a secure manner, then in certain situations it may not matter whether the data has been encrypted or not. In addition, a cryptographic key may need to be validated to determine that the cryptographic key is indeed the correct key for encryption or decryption.

Certain embodiments implement a cryptographic unit to provide a secure method for handling the cryptographic key such that the cryptographic key can never leave the cryptographic unit in a clear state. For example, in certain embodiments a cryptographic key is written to a plurality of write only registers by microcode, and after writing a cryptographic key the microcode destroys all storage pointers to the cryptographic key. Multiplexers may protect against any clear keys being read and the cryptographic keys cannot be read via register interfaces or debug ports.

Certain embodiments provide a comparison function that compares two write only registers capable of storing the same cryptographic key, wherein the comparison function can set an error flag to alert the microcode when values stored in the two registers do not match. In certain embodiments, the error flag may also be set to alert the microcode when the cryptographic keys stored in the two write only registers are identical but are of different sizes. For example, if an encryption engine stores a 128-bit cryptographic key and the corresponding decryption engine stores a 256-bit cryptographic key, then the error flag will be set to alert the microcode even if the two cryptographic keys are identical.

In addition, in certain embodiments tire cryptographic unit provides mechanisms for validating the cryptographic key before the cryptographic unit starts reading encrypted data records. If the cryptographic unit has the correct cryptographic key, then decryption can proceed. If the cryptographic unit does not have the correct cryptographic key, decryption is stalled until the cryptographic unit receives the correct cryptographic key.

Exemplary Embodiments

Figure 1:
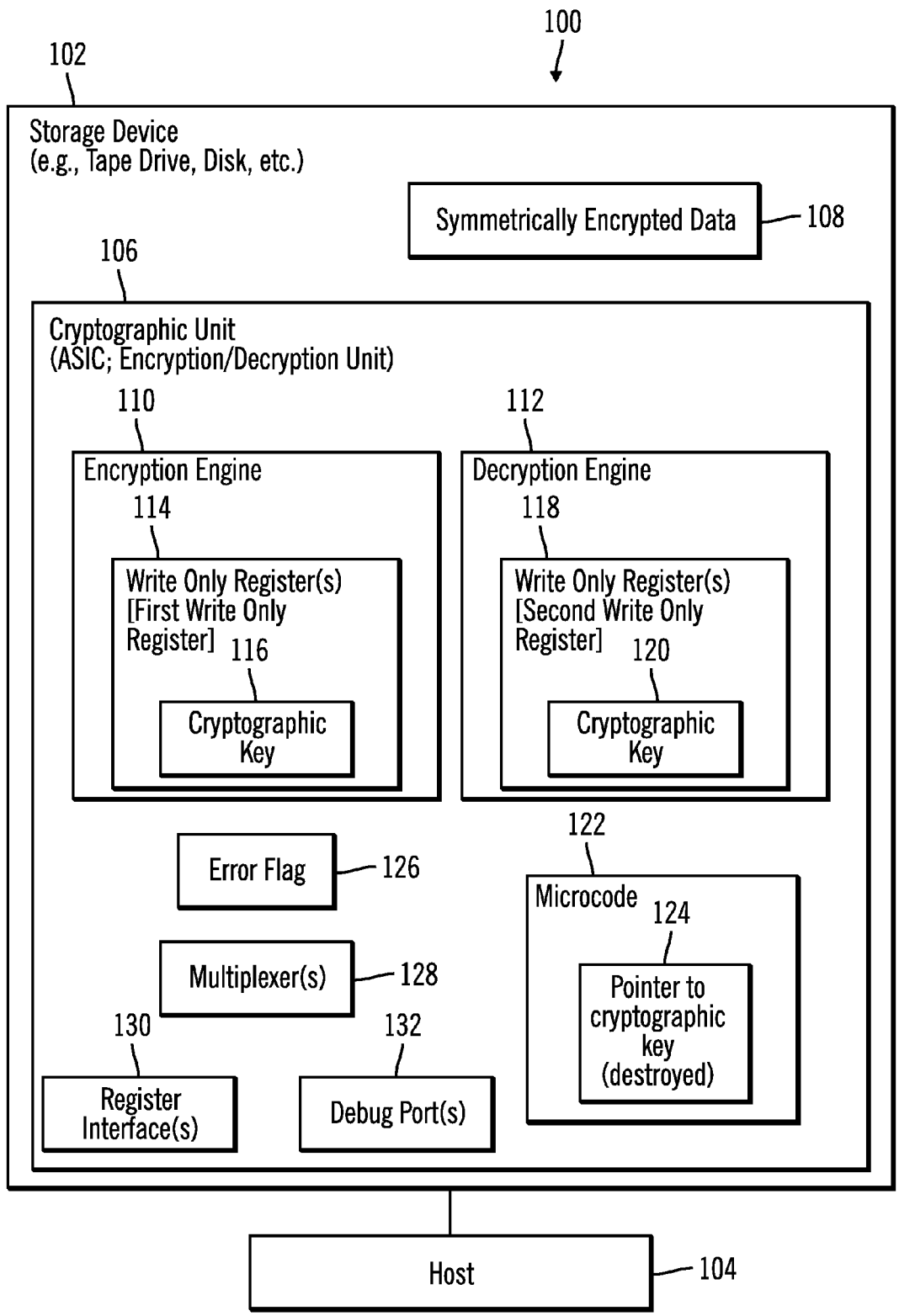
FIG. 1 illustrates a block diagram of a computing environment in accordance with certain embodiments.

FIG. 1 illustrates a block diagram of a computing environment 100 in accordance with certain embodiments. The computing environment 100 includes at least one storage device 102 that may be coupled to a host 104 either directly or over a network such as a storage area network.

The storage device 102 may comprise of one of more tape devices, disk drives, or any other suitable storage devices known in the art. The host 104 may comprise any computational device including those presently known in the art, such as, a personal computer, a workstation, a mainframe, a midrange computer, a network appliance, a palm top computer, a telephony device, a blade computer, a hand held computer, etc.

The storage device 104 includes at least one cryptographic unit 108, wherein the at least one cryptographic unit 106 may be implemented in application specific integrated circuit (ASIC) and may be referred to as an encryption/decryption unit. In still further embodiments, the cryptographic unit 106 may be implemented in software, hardware, firmware, or any combination thereof, inside or outside of the storage device 102. For example, the cryptographic unit 106 may be implemented in a computational device outside the storage device 102 or may be a stand-alone unit.

The storage device 102 may store symmetrically encrypted data 108 on a storage medium, such as a tape or a disk, in order to provide protection to data. Data received by the storage device 102 may be encrypted by the cryptographic unit 106 and stored in the storage device 102 as symmetrically encrypted data 108. The storage device 102 may use the cryptographic unit 106 to decrypt any encrypted data.

The cryptographic unit 106 may comprise an encryption engine 110 and a decryption engine 112. The encryption engine 110 and the decryption engine 112 may be implemented in hardware, software, firmware or any combination thereof. The encryption engine 110 includes at least one write only register 114 in which a cryptographic key 116 can be written. Similarly, the decryption engine 112 includes at least one write only register 118 in which a cryptographic key 120 can be written. The encryption engine 110 may use the cryptographic key 116 to encrypt data, and the decryption engine 112 may use the cryptographic key 120 to decrypt data that has been encrypted. In certain embodiments, the cryptographic keys 116, 120 are inaccessible for reading from any entity that is external to the cryptographic unit 106. Cryptographic mechanisms, such as, AES-GCM or other mechanisms may be used by the cryptographic unit 106 to encrypt or decrypt data. A new cryptographic key can only be loaded by overwriting the write only registers 114, 118 with the new cryptographic key.

The cryptographic unit 106 may also include microcode 122 that may be used to implement mechanisms for writing cryptographic keys 116, 120 to write only registers 114, 118 and perform other operations. The microcode 122 may include one or more pointers 124 to the cryptographic keys 116, 120, where the pointers 124 are destroyed after writing the cryptographic keys 116, 120.

Additionally, the cryptographic unit includes an error flag 126, where the error flag 126 in an indicator implemented in hardware, software, firmware or any combination thereof. An error in the cryptographic unit 106 may cause different values to be stored in the write only register 114 of the encryption engine 110 and the write only register 118 of the decryption engine 112, even if the microcode 122 has requested that the same cryptographic key be stored in the write only register 114 of the encryption engine 110 and the write only register 118 of the decryption engine 112. The error flag 126 may be set to "1" when different values are stored in the write only register 114 and the write only register 118. The setting of the error flag to "1" may indicate that the different cryptographic keys are stored in the encryption engine 110 and the decryption engine 112, wherein cryptographic keys that are identical hut are of different key lengths are different cryptographic keys. The error flag 126 may be set to "0" when same values are stored in the write only register 114 and the write only register 118.

The cryptographic unit also includes one or more multiplexers 128, one or more register interfaces 130 to the write only registers 114, 118 and one or more debug ports 132. The multiplexers 128 may protect against any clear cryptographic keys from being read out of the cryptographic unit 106. The register interfaces 130 and the debug ports 132 cannot be used to read the cryptographic keys 116, 120 that have been stored in the write only registers 114, 118.

Therefore, FIG. 1 illustrates certain embodiments in which a first write only register 114 is maintained in an encryption engine 110 of a cryptographic unit 106 and a second write only register 118 is maintained in a decryption engine 112 of the cryptographic unit 106. A cryptographic key is written in the first write only register 114 and the second write only register 118, wherein the cryptographic key is inaccessible for reading from any entity that is external to the cryptographic unit 106. An error in the cryptographic unit 106 can cause different values to be stored in the first write only register 114 of the encryption engine 110 and tire second write only register 118 of the decryption engine 112, in response to writing the cryptographic key.

Figure 2:
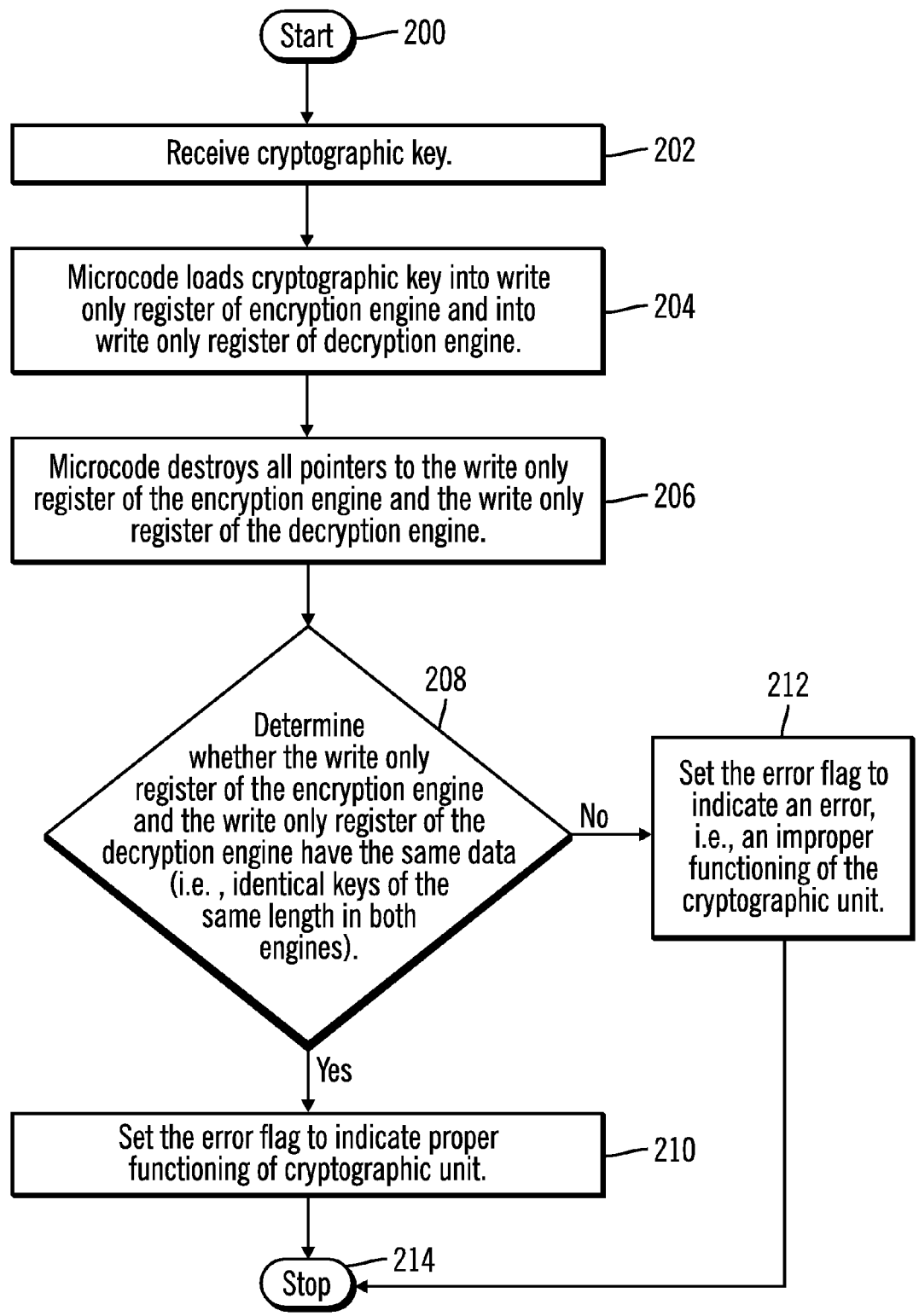
FIG. 2 illustrates a flowchart that shows operations for loading cryptographic keys into read only registers, in accordance with certain embodiments.

FIG. 2 illustrates a flowchart, that shows operations for loading cryptographic keys into read only registers, in accordance with certain embodiments. The operations illustrated in FIG. 2 may be implemented in the cryptographic unit 106 of the computing environment 100.

Control starts at block 200, and the cryptographic unit 106 receives (at block 202) a cryptographic key 202. The cryptographic key 202 may have been provided by the host 104 or by the storage device 102 or by any other device. The microcode 122 attempts to load (at block 204) the cryptographic key into the write only register 114 of tire encryption engine 110 and into the write only register 118 of the decryption engine 112. Thus the microcode 122 attempts to write the same cryptographic key to the write only register 114 of the encryption engine 110 and the write only register 118 of the decryption engine 112. The loaded cryptographic key is shown as cryptographic key 116 in the write only register 114 and as cryptographic key 120 in the write only register 118.

The microcode 122 destroys (at block 206) all pointers 124 to the write only register 114 of the encryption engine 110 and the write only register 118 of the decryption engine 112. The destruction of the pointers 124 provides security to the cryptographic keys 116, 120 by preventing access to the cryptographic keys 116, 120 via the pointers 124.

An error in the cryptographic unit 106 may cause different values to be stored in the write only register 114 of the encryption engine 110 and the write only register 118 of the decryption engine 112, even if the microcode 122 has requested that the same cryptographic key be written to the write only register 114 of the encryption engine 110 and the write only register 118 of the decryption engine 112. The cryptographic unit 106 determines (at block 208) whether the write only register 114 of the encryption engine 110 and the write only register 118 of the decryption engine 112 have the same data (i.e., identical keys of the same length are stored in both engines). If so, then the error flag 126 is set (at block 210) to "0" to indicate proper functioning of the cryptographic unit 106. If not, then the error flag 126 is set (at block 212) to "1" to indicate an error, i.e., an improper functioning of the cryptographic unit 106. Form blocks 210 and 212 control proceeds to block 214 where the process stops.

Therefore, FIG. 2 illustrates certain embodiments in which a process writes the same cryptographic key to both an encryption engine 110 and a decryption engine 112 and after writing the cryptographic key verifies that the writing has completed properly. If for any reason, the cryptographic keys in 116 are 120 are different then the cryptographic unit 106 indicates an error via the error flag 126.

Figure 3A:
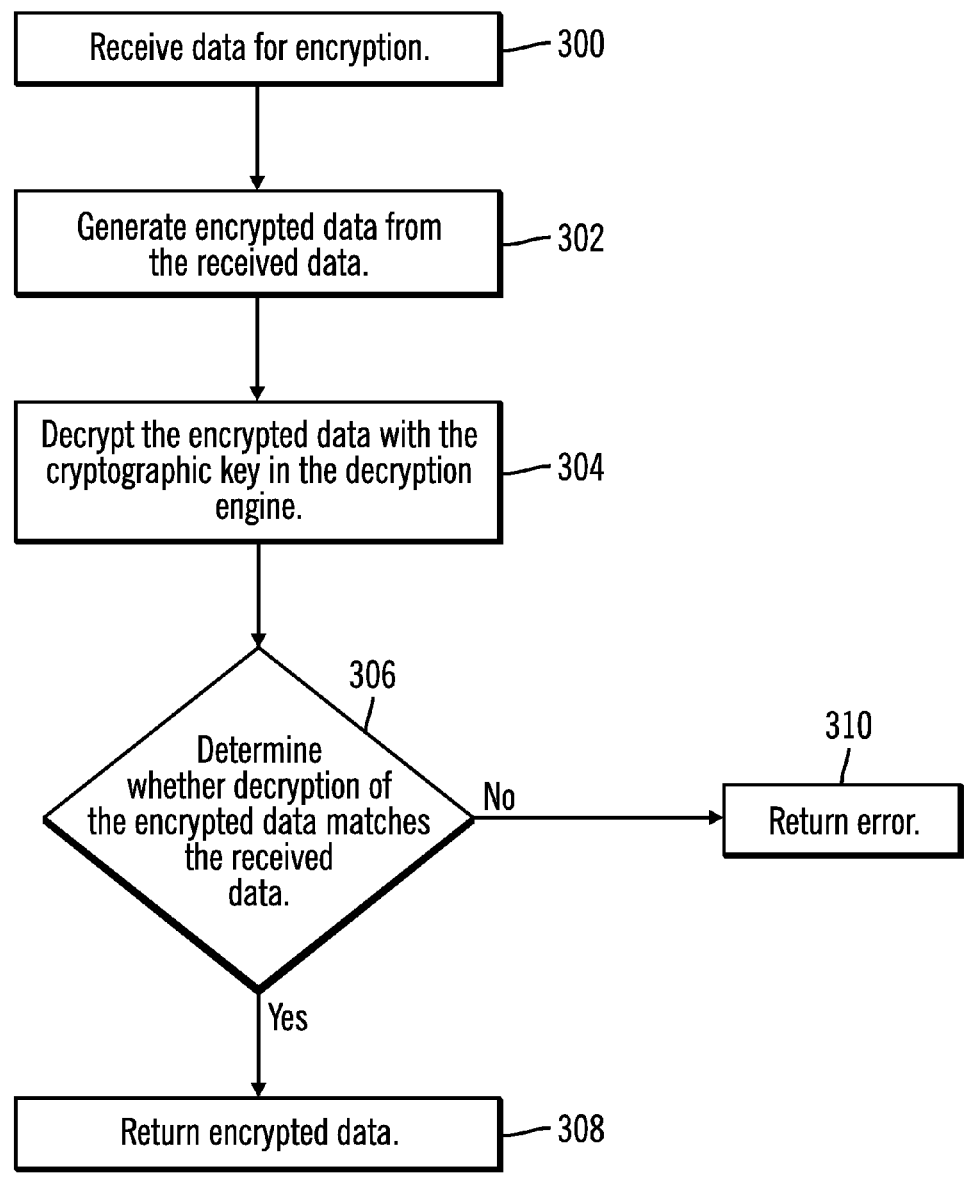
FIG. 3a illustrates a flowchart for encrypting data, in accordance with certain embodiments.

FIG. 3a illustrates a flowchart for encrypting data, in accordance with certain embodiments. The operations illustrated in FIG. 3a may be implemented in the cryptographic unit 106 of the computing environment 100.

Control starts at block 300, where the cryptographic unit 106 receives data for encryption. The cryptographic unit 106 uses the encryption engine 110 to generate (at block 302) encrypted data from the received data via an application of the cryptographic key 116 stored in the write only register 114 of the encryption engine 110. Subsequently, the cryptographic unit 106 decrypts (at block 304) the encrypted data with the cryptographic key 120 in the decryption engine 112.

The cryptographic unit 106 determines (at block 306) whether the decryption of the encrypted data matches the received data. If so, then the cryptographic unit 106 returns (at block 308) the encrypted data. If not, then the cryptographic unit 106 returns (at block 310) an error because the decryption of the encrypted received data should match the received data if the cryptographic unit 106 is functioning properly.

Therefore, FIG. 3a illustrates certain environments in which a cryptographic unit 106 verifies that an encryption of received data is being performed properly by determining that a decryption of the encrypted received data matches the received data.

Figure 3B:
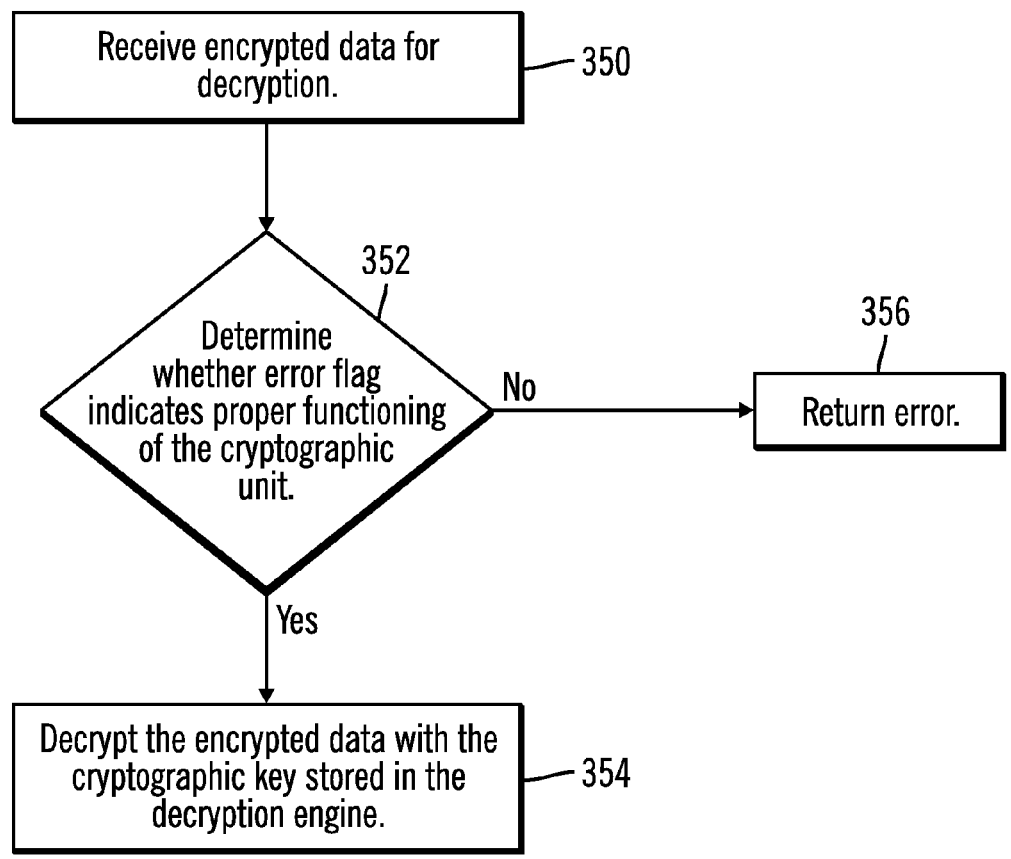
FIG. 3b illustrates a flowchart for decrypting data, in accordance with certain embodiments.

FIG. 3b illustrates a flowchart for decrypting data, in accordance with certain embodiments. The operations illustrated in FIG. 3b may be implemented in the cryptographic unit 106 of the computing environment 100.

Control starts at block 350, where the cryptographic unit 106 receives encrypted data for decryption. The cryptographic unit 106 determines (at block 352) whether the error flag 126 indicates proper functioning of the cryptographic unit 106. If so, then the cryptographic unit 106 decrypts (at block 354) the encrypted data with the cryptographic key 120 stored in the write only register 118 of the decryption engine 112. If not, then the cryptographic unit 106 returns (at block 356) an error.

Therefore, FIG. 3b illustrates certain embodiments in which the cryptographic unit 106 decrypts encrypted data when the error flag 126 indicates that the cryptographic unit 106 is functioning properly. In certain embodiments, the cryptographic unit 106 is functioning properly when the same value is stored in the write only register 114 and the write only register 118, i.e., the same cryptographic key that, has been used for encryption is used for decryption.

Certain embodiments protect data by safeguarding cryptographic keys 116, 120 in write only registers 114, 118 within a cryptographic unit 106. A verification is performed to ensure that the same cryptographic key that is used for encryption is used for decryption. The cryptographic keys 116, 120 cannot be accessed from entities external to the cryptographic unit 106.

Storage Library and Storage Device Related Embodiments

Figure 4:
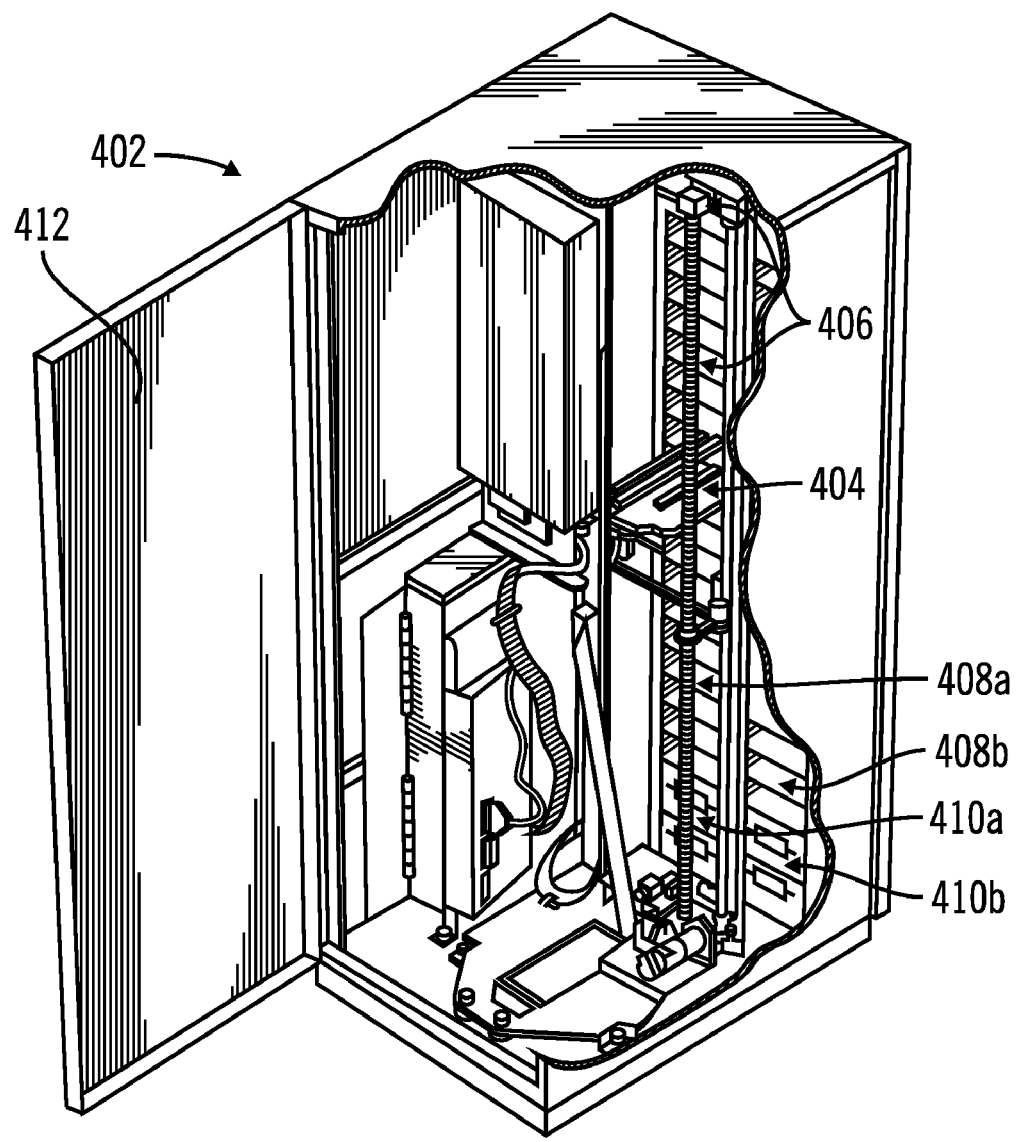
FIG. 4 illustrates an embodiment of a storage library, in accordance with certain embodiments.
Figure 5:
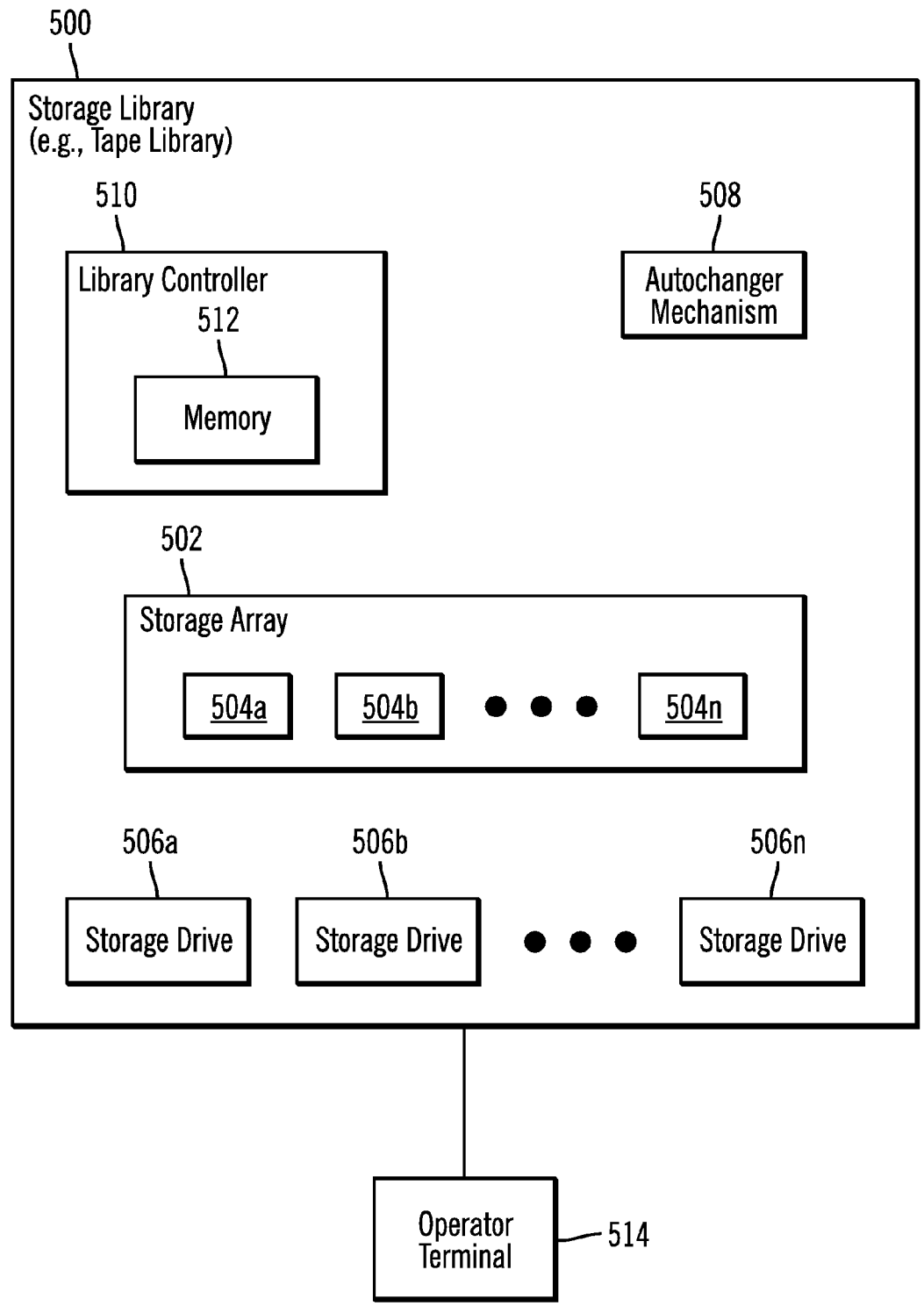
FIG. 5 illustrates an embodiment of components in a storage library, in accordance with certain embodiments.
Figure 6:
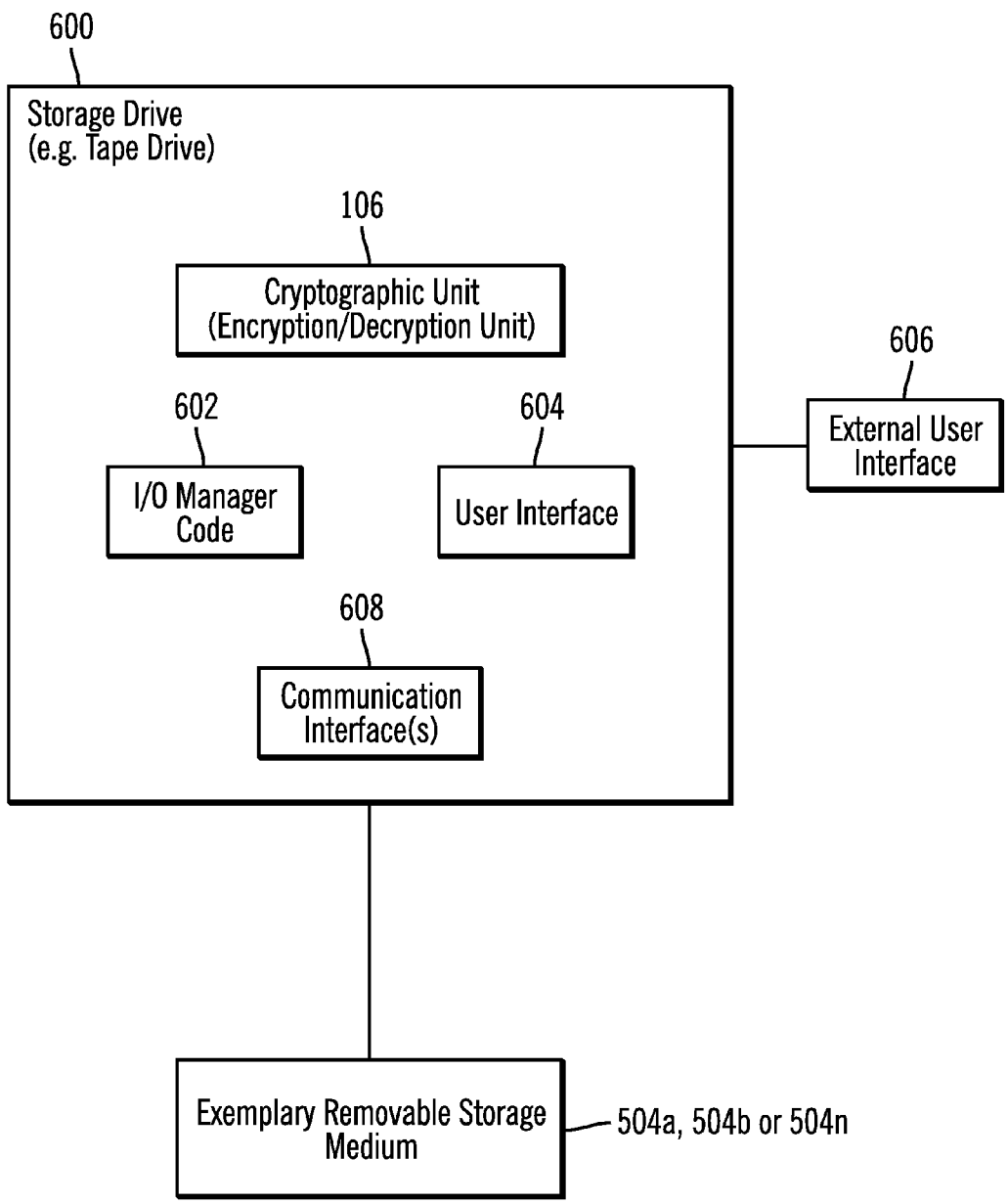
FIG. 6 illustrates an embodiment of components of a storage drive capable of interfacing with a removable storage media, in accordance with certain embodiments.

FIGS. 1, 2, 3*a*, 3*b* have described certain embodiments which illustrate certain interactions of an encryption/decryption unit 106 with other elements included in the storage device 102 and the host 104. FIGS. 4-6 illustrate certain additional embodiments in which the encryption/decryption unit, i.e., the cryptographic unit, 106 is included a storage drive, such as a tape drive, wherein in certain embodiments one or more storage drive may be implemented in a storage library.

FIG. 4 illustrates a storage library, such as an automated tape library 402, known in the prior art. The tape library 402 includes a library controller, an input/output station, a picker assembly 404, a carriage assembly 406, storage cells 408*a*, 408*b*, and optical disk drives (not shown). The term "library element" as used herein refers to any slot in the automated tape library 402 in which storage cartridges may be disposed, e.g., the input/output stations, the storage cells 408*a*, 408*b*, etc. The library controller includes a processor, RAM, and other controls and interfaces to direct the actions of the library components. The library controller further interacts with a host processor to respond to library commands transmitted from the host processor. The input/output station is the opening through which the user may insert or remove a cartridge. An operator panel on the outside of the box housing the tape library 402 allows the user to communicate with the library controller. When adding a cartridge through the input/output slot, the user may indicate the addition of a cartridge using the operator panel. The tape library 402 also includes an access door 412 through which the user may add or remove cartridges maintained in the storage cells 408*a*, 408*b*.

The tape library 402 has two columns of storage cells 408*a*, 408*b* and storage drives 410*a*, 410*b* that perform read and write operations with respect to the storage media cartridges. A picker assembly 404 is capable of manipulating the storage media cartridges in the library elements. A carriage assembly 406 moves the picker assembly 404, and any media storage cartridge held by the picker assembly 404, among the library elements. The carriage assembly 406 transports tire picker assembly 404 to a destination library element. The picker assembly 404 can rotate to turn the storage media cartridge over. The picker assembly 404 has a finger mechanism to remove or insert, a storage media cartridge to a library element. Once inserted in the storage drive 410*a*, 410*b*, data can be read from the storage media cartridge and sent to a host processor. Data transmitted from the host processor can be written to the storage media cartridge inserted in a storage drive 410*a*, 410*b*. One or more of the storage cells 408*a*, 408*b* in each column may comprise an Input/Output slot through which a user may remove a storage media cartridge from the tape library 402 or can insert a storage media cartridge into the tape library 402.

In further embodiments, the tape library 402 may include distributed computing components, such as distributed controller, distributed storage cells and distributed picker assemblies. Yet further, the tape library 402 may be partitioned into one or more logical libraries having multiple storage drives. Each storage drive may be configured independently of any other drive. In addition, groups of storage drives may be configured at the same time or with the same settings. This may include all storage drives in a frame, all storage drives in a logical library, all storage drives in a physical library, or all storage drives selected from a list.

FIG. 5 illustrates an embodiment of an automated storage library 500 including a storage array 502, such as the storage cells 408*a*, 408*b* (FIG. 4), including removable storage media 504*a*, 504*b*, . . . 504*n*; storage drives 506*a*, 506*b*, . . . , 506*k*, such as a tape drive, optical disk drive or other interface to which a removable storage media is coupled to for access; an autochanger mechanism 508 to transfer removable storage media 504*a* . . . 504*n* between the storage array 502 and storage drive 506*a* . . . 506*k*, such as the picker assembly 404 (FIG. 4); and a library controller 510.

The removable storage media 504*a* . . . 504*n* may comprise any type of media on which data may be stored and which may serve as removable media, including but not limited to magnetic media (such as magnetic tape or disks), optical media (such as optical tape or disks), electronic media (such as PROM, EEPROM, flash PROM, MRAM, etc.), or other suitable media. In certain embodiments, the removable storage media has a cartridge housing, such as the case with a magnetic tape cartridge or a removable disk drive.

In certain embodiments, the library controller 510 is comprised of a microprocessor and various controls and interfaces to control the operation of the components in the automated library 500, including the autochanger mechanism 508 and storage drives 506*a* . . . 506*k*. The library controller 510 utilizes a memory 512 to store various information, such as a storage media map maintaining information on the location of removable storage media 504*a* . . . 504*n* in the library 500, including the content of the library elements in the storage array 502. The library controller 510 may comprise a single processing unit or distributed processing units.

The library controller 510 may further manage read/write operations with respect to removable storage media 504*a* . . . 504*n* in the storage library 500. A library operator may directly control operations and the management of removable storage media 504*a* . . . 504*n* through an operator terminal 514 coupled to the library 500, comprising of a display device and keyboard, to interface with the library controller 510. Additionally, a host system (not shown) may send commands to the library controller 510 to control operations within the automated library 500 or perform read or write operations on volumes within removable storage media 504*a* . . . 504*n* managed by the library 500, where the host system may communicate with the library 500 over a network or through a direct cable connection.

FIG. 6 illustrates an embodiment of a storage drive 600 that is capable of performing I/O operations with respect to a coupled exemplary removable storage media 504*a*, 504*b*, or 504*n* that are capable of being inserted into the storage drive 600. The storage drive 600 includes I/O manager code 602 to perform read/write operations with respect to a coupled removable storage media 504*a*, 504*b*, or 504*n*. The storage drive 600 includes a user interface 604 comprising user controls on the storage drive 600 housing to configure and control the storage drive 600. Further, in certain embodiments, an external user interface 606 may optionally be coupled to the storage drive 600 providing additional user controls used to configure and control the storage drive 600. The storage drive 600 may correspond to the storage device 102 (shown in FIG. 1) and may include one or more communication interfaces 608, the encryption/decryption unit 106 (shown in FIG. 1), and other elements shown in the storage device 102 of FIG. 1. In certain embodiments the symmetrically encrypted data 108 (shown in FIG. 1) may be included in the storage drive 600 and correspond to one of the removable storage media 504*a*, 504*b* or 504*n*.

The user interface 604 and optional external user interface 606 may include user interface elements for interacting with the storage drives 506a . . . 506k, such as an eject button for manually unloading removable storage media 504a, 504b or 504n, up/down buttons for navigating a list of items, enter/exit buttons for selecting items or exiting from a menu or list, and one or more status displays (e.g., a light or LED (Light Emitting Diode), a numeric display, and alphanumeric display, etc.) The external user interface 606 may comprise a computer, workstation, personal computer, palm computer, web user interface, proprietary user interface, or any other device capable of providing a user interface for the storage drives 506a . . . 506k.

The encryption/decryption unit 106 and I/O manager code 602 may be implemented as hardware logic in the storage drive 600 or in computer executable instructions that are accessed and executed by a processor (not shown) in the storage drive 600. In certain embodiments the storage drive 600 is a tape drive.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drive, floppy disk, tape, etc.), optical storage (CD-ROM, optical disk, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in certain operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system for apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital video disk (DVD).

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 7:
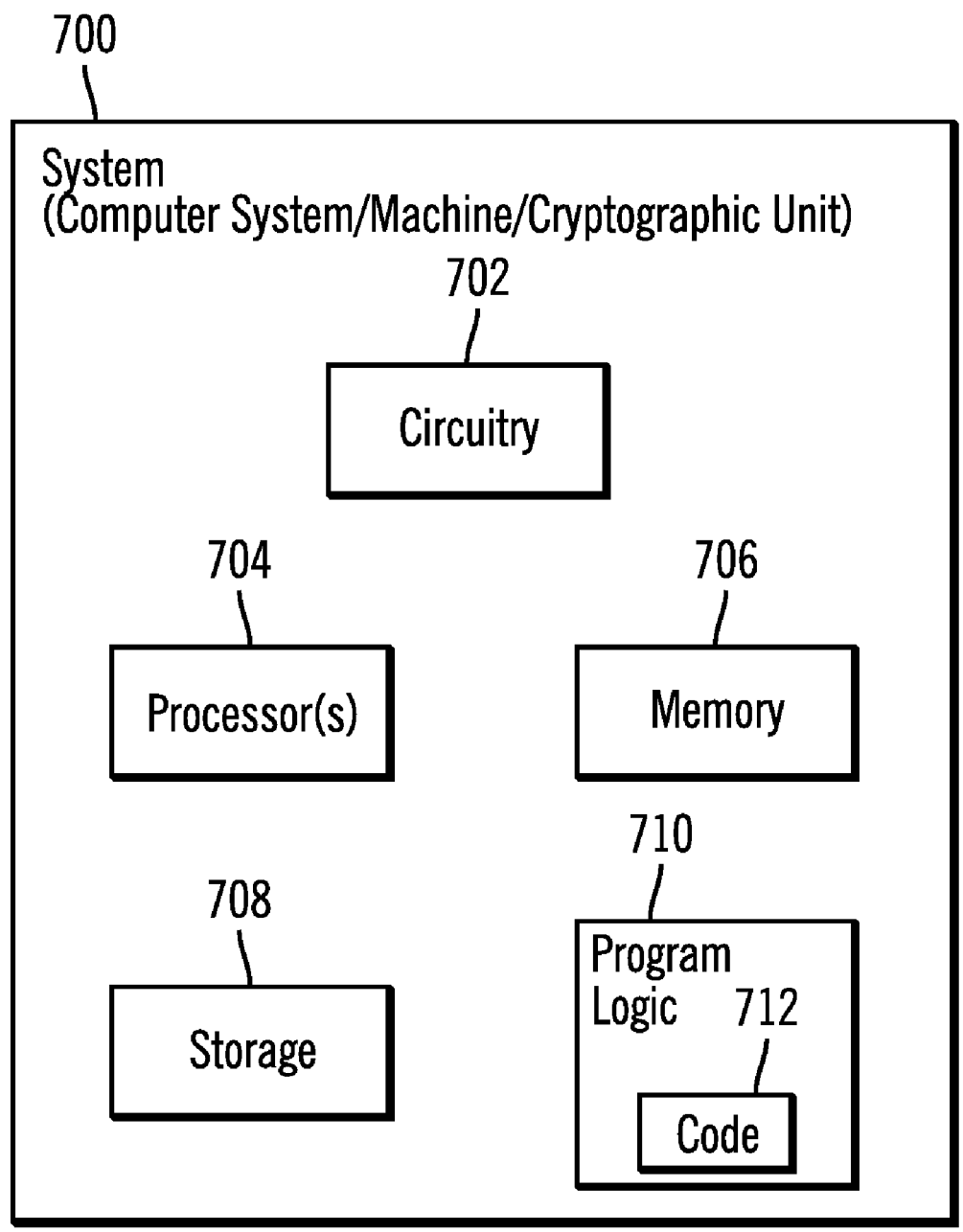
FIG. 7 illustrates the architecture of computing system, wherein in certain embodiments elements of the computing environment of FIG. 1 may be implemented in accordance with the architecture of the computing system.

FIG. 7 illustrates an exemplary computer system 700, wherein in certain embodiments the cryptographic unit 106 of the computing environment 100 of FIG. 1 may be implemented in accordance with the computer architecture of the computer system 700. The computer system 700 may also be referred to as a system or a machine and may include a circuitry 702 that may in certain embodiments include a processor 704. The system 700 may also include a memory 706 (e.g., a volatile memory device), and storage 708. Certain elements of the system 700 may or may not be found in the cryptographic unit 106 of FIG. 1. The storage 708 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 708 may comprise an internal storage device, an attached storage device and/or a network accessible storage device. The system 700 may include a program logic 710 including code 712 that may be loaded into the memory 706 and executed by the processor 704 or circuitry 702. In certain embodiments, the program logic 710 including code 712 may be stored in the storage 708. In certain other embodiments, the program logic 710 may be implemented in the circuitry 702. Therefore, while FIG. 7 shows the program logic 710 separately from the other elements, the program logic 710 may be implemented in the memory 706 and/or the circuitry 702.

Certain embodiments may be directed towards a method for deploying computing infrastructure by a person or via automated processing. Certain other embodiments may be directed towards integrating computer-readable code into a computing system, wherein the code in combination with the computing system is enabled to perform the operations described earlier.

At least certain of the operations illustrated in FIGS. 2, 3a, and 3b may be performed in parallel as well as sequentially, in alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-7 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

*IEEE P1619.1 is a trademark or registered trademark of Institute of Electrical and Electronics Engineers, Inc.

What is claimed is:

1. A method, comprising:
maintaining a first write only register in an encryption engine of a cryptographic unit;
maintaining a second write only register in a decryption engine of the cryptographic unit;
maintaining an error flag in the cryptographic unit;
writing a cryptographic key in the first write only register and the second write only register, wherein the cryptographic key is inaccessible for reading from any entity that is external to the cryptographic unit;
subsequent to writing the cryptographic key in the first write only register and the second write only register and prior to receiving encrypted data for decryption at the cryptographic unit performing:
 determining whether the first write only register has a different value than the second write only register because of an error in the cryptographic unit;
 setting the error flag, to indicate the error in the cryptographic unit, in response to determining that the first write only register has a different value than the second write only register; and
 setting the error flag to indicate proper functioning of the cryptographic unit, in response to determining that the first write only register does not have a different value than the second write only register; and
subsequent to setting the error flag, performing:
 receiving the encrypted data for decryption at the cryptographic unit;
 decrypting the encrypted data in the cryptographic unit by using the cryptographic key written in the second write only register of the decryption engine, in response to determining that the error flag indicates proper functioning of the cryptographic unit; and
 responding with an error indication, in response to determining that the error flag indicates the error in the cryptographic unit.

2. The method of claim 1, wherein the error in the cryptographic unit causes different values to be stored in the first write only register of the encryption engine and the second write only register of the decryption engine, in response to writing the cryptographic key.

3. The method of claim 1, wherein the cryptographic key is written by microcode included in the cryptographic unit, the method further comprising:
destroying all pointers that point to the cryptographic key in the cryptographic unit after writing the cryptographic key.

4. The method of claim 1, wherein writing the cryptographic key results in a first value being writing to the first write only register and a second value being written to the second write only register, wherein the first value and the second value may be same or different, the method further comprising:
receiving data for encryption at the cryptographic unit;
encrypting the received data by using the first value written to the first write only register of the encryption engine to generate encrypted data;
decrypting the encrypted data by using the second value written to the second write only register of the decryption engine to generate decrypted data;
determining whether the decrypted data is the same as the received data;
sending the generated encrypted data for storage, in response to determining that the decrypted data is the same as the received data; and
generating an error, in response to determining that the decrypted data is not the same as the received data.

5. The method of claim 1, wherein the cryptographic key is a previously loaded cryptographic key, wherein a new cryptographic key is loaded by overwriting the first and the second write only registers with the new cryptographic key.

6. The method of claim 1, wherein:
the cryptographic unit is included within a storage library having a library controller and an autochanger mechanism; and
a multiplexer included within the cryptographic unit prevents the cryptographic key from being read out of the cryptographic unit.

7. A cryptographic unit, comprising:
a memory;
an encryption engine coupled to the memory;

a decryption engine coupled to the memory;
a first write only register included in the encryption engine;
a second write only register included in the decryption engine;
an error flag coupled to the memory; and
a processor coupled to the memory, wherein the processor performs operations, and wherein the operations comprise:
    writing a cryptographic key in the first write only register and the second write only register, wherein the cryptographic key is inaccessible for reading from any entity that is external to the cryptographic unit;
    subsequent to writing the cryptographic key in the first write only register and the second write only register and prior to receiving encrypted data for decryption at the cryptographic unit performing:
        determining whether the first write only register has a different value than the second write only register because of an error in the cryptographic unit;
        setting the error flag, to indicate the error in the cryptographic unit, in response to determining that the first write only register has a different value than the second write only register; and
        setting the error flag to indicate proper functioning of the cryptographic unit, in response to determining that the first write only register does not have a different value than the second write only register; and
    subsequent to setting the error flag, performing:
        receiving the encrypted data for decryption at the cryptographic unit;
        decrypting the encrypted data in the cryptographic unit by using the cryptographic key written in the second write only register of the decryption engine, in response to determining that the error flag indicates proper functioning of the cryptographic unit; and
        responding with an error indication, in response to determining that the error flag indicates the error in the cryptographic unit.

8. The cryptographic unit of claim 7, wherein the error in the cryptographic unit causes different values to be stored in the first write only register of the encryption engine and the second write only register of the decryption engine, in response to writing the cryptographic key.

9. The cryptographic unit of claim 7, wherein the cryptographic key is written by microcode included in the cryptographic unit, the operations performed by the processor further comprising:
    destroying all pointers that point to the cryptographic key in the cryptographic unit after writing the cryptographic key.

10. The cryptographic unit of claim 7, wherein writing the cryptographic key results in a first value being writing to the first write only register and a second value being written to the second write only register, wherein the first value and the second value may be same or different, the operations performed by the processor further comprising: receiving data for encryption at the cryptographic unit;
    encrypting the received data by using the first value written to the first write only register of the encryption engine to generate encrypted data;
    decrypting the encrypted data by using the second value written to the second write only register of the decryption engine to generate decrypted data;
    determining whether the decrypted data is the same as the received data;
    sending the generated encrypted data for storage, in response to determining that the decrypted data is the same as the received data; and
    generating an error, in response to determining that the decrypted data is not the same as the received data.

11. The cryptographic unit of claim 7, wherein the cryptographic key is a previously loaded cryptographic key, wherein a new cryptographic key is loaded by overwriting the first and the second write only registers with the new cryptographic key.

12. The cryptographic unit claim 7, wherein:
    the cryptographic unit is included within a storage library having a library controller and an autochanger mechanism; and
    a multiplexer included within the cryptographic unit prevents the cryptographic key from being read out of the cryptographic unit.

13. An article of manufacture, wherein the article of manufacture includes machine readable instructions stored in a non-transitory medium, wherein the machine readable instructions cause operations on a machine comprising a cryptographic unit, the operations comprising:
    maintaining a first write only register in an encryption engine of the cryptographic unit;
        maintaining a second write only register in a decryption engine of the cryptographic unit;
        maintaining an error flag in the cryptographic unit;
        writing a cryptographic key in the first write only register and the second write only register, wherein the cryptographic key is inaccessible for reading from any entity that is external to the cryptographic unit;
        subsequent to writing the cryptographic key in the first write only register and the second write only register and prior to receiving encrypted data for decryption at the cryptographic unit performing:
    determining whether the first write only register has a different value than the second write only register because of an error in the cryptographic unit;
    setting the error flag, to indicate the error in the cryptographic unit, in response to determining that the first write only register has a different value than the second write only register; and
    setting the error flag to indicate proper functioning of the cryptographic unit, in response to determining that the first write only register does not have a different value than the second write only register; and
    subsequent to setting the error flag, performing:
    receiving the encrypted data for decryption at the cryptographic unit;
    decrypting the encrypted data in the cryptographic unit by using the cryptographic key written in the second write only register of the decryption engine, in response to determining that the error flag indicates proper functioning of the cryptographic unit; and
    responding with an error indication, in response to determining that the error flag indicates the error in the cryptographic unit.

14. The article of manufacture of claim 13, wherein the error in the cryptographic unit causes different values to be stored in the first write only register of the encryption engine and the second write only register of the decryption engine, in response to writing the cryptographic key.

15. The article of manufacture of claim 13, wherein the cryptographic key is written by microcode included in the cryptographic unit, the operations further comprising:

destroying all pointers that point to the cryptographic key in the cryptographic unit after writing the cryptographic key.

16. The article of manufacture of claim 13, wherein writing the cryptographic key results in a first value being writing to the first write only register and a second value being written to the second write only register, wherein the first value and the second value may be same or different, the operations further comprising:
receiving data for encryption at the cryptographic unit;
encrypting the received data by using the first value written to the first write only register of the encryption engine to generate encrypted data;
decrypting the encrypted data by using the second value written to the second write only register of the decryption engine to generate decrypted data;
determining whether the decrypted data is the same as the received data;
sending the generated encrypted data for storage, in response to determining that the decrypted data is the same as the received data; and
generating an error, in response to determining that the decrypted data is not the same as the received data.

17. The article of manufacture of claim 13, wherein the cryptographic key is a previously loaded cryptographic key, wherein a new cryptographic key is loaded by overwriting the first and the second write only registers with the new cryptographic key.

18. The article of manufacture of claim 13, wherein:
the cryptographic unit is included within a storage library having a library controller and an autochanger mechanism; and
a multiplexer included within the cryptographic unit prevents the cryptographic key from being read out of the cryptographic unit.

19. A storage library, comprising:
at least one storage drive; and
at least one cryptographic unit included in the at least one storage drive, wherein the at least one cryptographic unit performs:
maintaining a first write only register in an encryption engine of the at least one cryptographic unit;
maintaining a second write only register in a decryption engine of the at least one cryptographic unit;
maintaining an error flag in the at least one cryptographic unit;
writing a cryptographic key in the first write only register and the second write only register, wherein the cryptographic key is inaccessible for reading from any entity that is external to the at least one cryptographic unit;
subsequent to writing the cryptographic key in the first write only register and the second write only register and prior to receiving encrypted data for decryption at the at least one cryptographic unit performing:
determining whether the first write only register has a different value than the second write only register because of an error in the at least one cryptographic unit;
setting the error flag, to indicate the error in the at least one cryptographic unit, in response to determining that the first write only register has a different value than the second write only register; and
setting the error flag to indicate proper functioning of the at least one cryptographic unit, in response to determining that the first write only register does not have a different value than the second write only register; and subsequent to setting the error flag, performing:
receiving the encrypted data for decryption at the at least one cryptographic unit;
decrypting the encrypted data in the at least one cryptographic unit by using the cryptographic key written in the second write only register of the decryption engine, in response to determining that the error flag indicates proper functioning of the at least one cryptographic unit; and
responding with an error indication, in response to determining that the error flag indicates the error in the at least one cryptographic unit.

20. The storage library of claim 19, wherein the error in the at least one cryptographic unit causes different values to be stored in the first write only register of the encryption engine and the second write only register of the decryption engine, in response to writing the cryptographic key.

21. The storage library of claim 19, wherein the cryptographic key is written by microcode included in the at least one cryptographic unit, wherein the at least one cryptographic unit further performs:
destroying all pointers that point to the cryptographic key in the at least one cryptographic unit after writing the cryptographic key.

22. The storage library of claim 19, wherein writing the cryptographic key results in a first value being writing to the first write only register and a second value being written to the second write only register, wherein the first value and the second value may be same or different, wherein the at least one cryptographic unit further performs:
receiving data for encryption at the at least one cryptographic unit;
encrypting the received data by using the first value written to the first write only register of the encryption engine to generate encrypted data;
decrypting the encrypted data by using the second value written to the second write only register of the decryption engine to generate decrypted data;
determining whether the decrypted data is the same as the received data;
sending the generated encrypted data for storage, in response to determining that the decrypted data is the same as the received data; and
generating an error, in response to determining that the decrypted data is not the same as the received data.

23. The storage library of claim 19, wherein the storage library is a tape library, wherein the cryptographic key is a previously loaded cryptographic key, wherein a new cryptographic key is loaded by overwriting the first and the second write only registers with the new cryptographic key.

24. The storage library of claim 19, wherein:
the at least one cryptographic unit is included within a storage library having a library controller and an autochanger mechanism; and
a multiplexer included within the at least one cryptographic unit prevents the cryptographic key from being read out of the at least one cryptographic unit.

25. A storage drive, comprising:
removable storage medium; and
at least one cryptographic unit coupled to the removable storage medium, wherein the at least one cryptographic unit performs:
maintaining a first write only register in an encryption engine of the at least one cryptographic unit;
maintaining a second write only register in a decryption engine of the at least one cryptographic unit;

maintaining an error flag in the at least one cryptographic unit;

writing a cryptographic key in the first write only register and the second write only register, wherein the cryptographic key is inaccessible for reading from any entity that is external to the at least one cryptographic unit;

subsequent to writing the cryptographic key in the first write only register and the second write only register and prior to receiving encrypted data for decryption at the at least one cryptographic unit performing:

determining whether the first write only register has a different value than the second write only register because of an error in the at least one cryptographic unit;

setting the error flag, to indicate the error in the at least one cryptographic unit, in response to determining that the first write only register has a different value than the second write only register; and setting the error flag to indicate proper functioning of the at least one cryptographic unit, in response to determining that the first write only register does not have a different value than the second write only register; and subsequent to setting the error flag, performing:

receiving the encrypted data for decryption at the at least one cryptographic unit;

decrypting the encrypted data in the at least one cryptographic unit by using the cryptographic key written in the second write only register of the decryption engine, in response to determining that the error flag indicates proper functioning of the at least one cryptographic unit; and responding with an error indication, in response to determining that the error flag indicates the error in the at least one cryptographic unit.

26. The storage drive of claim 25, wherein the error in the at least one cryptographic unit causes different values to be stored in the first write only register of the encryption engine and the second write only register of the decryption engine, in response to writing the cryptographic key.

27. The storage drive of claim 25, wherein the cryptographic key is written by microcode included in the at least one cryptographic unit, wherein the at least one cryptographic unit further performs:

destroying all pointers that point to the cryptographic key in the at least one cryptographic unit after writing the cryptographic key.

28. The storage drive of claim 25, wherein writing the cryptographic key results in a first value being writing to the first write only register and a second value being written to the second write only register, wherein the first value and the second value may be same or different, wherein the at least one cryptographic unit further performs:

receiving data for encryption at the at least one cryptographic unit;

encrypting the received data by using the first value written to the first write only register of the encryption engine to generate encrypted data;

decrypting the encrypted data by using the second value written to the second write only register of the decryption engine to generate decrypted data;

determining whether the decrypted data is the same as the received data;

sending the generated encrypted data for storage, in response to determining that the decrypted data is the same as the received data; and generating an error, in response to determining that the decrypted data is not the same as the received data.

29. The storage drive of claim 25, wherein the storage drive is a tape drive, wherein the cryptographic key is a previously loaded cryptographic key, wherein a new cryptographic key is loaded by overwriting the first and the second write only registers with the new cryptographic key.

30. The storage drive of claim 25, wherein:

the at least one cryptographic unit is included within a storage library having a library controller and an autochanger mechanism; and a multiplexer included within the at least one cryptographic unit prevents the cryptographic key from being read out of the at least one cryptographic unit.

* * * * *